United States Patent
Chanda et al.

(10) Patent No.: US 9,552,603 B1
(45) Date of Patent: Jan. 24, 2017

(54) RELATING INDIVIDUAL ITEMS TO SIMILAR PURCHASED CATEGORIES

(75) Inventors: Gaurav Chanda, Seattle, WA (US); Brent Russell Smith, Redmond, WA (US); Homer G. Morgan, III, Seattle, WA (US); Ronald M. Whitman, Seattle, WA (US); Jeffrey T. Brownell, Beaverton, OR (US)

(73) Assignee: Amazon Technologies, Inc., Seattle, WA (US)

( * ) Notice: Subject to any disclaimer, the term of this patent is extended or adjusted under 35 U.S.C. 154(b) by 747 days.

(21) Appl. No.: 12/817,262

(22) Filed: Jun. 17, 2010

(51) Int. Cl.
*G06Q 30/00* (2012.01)
*G06F 17/30* (2006.01)
*G06Q 30/06* (2012.01)

(52) U.S. Cl.
CPC ................ *G06Q 30/0631* (2013.01)

(58) Field of Classification Search
CPC ................................. G06Q 30/0631
USPC ....................................... 705/26.7
See application file for complete search history.

(56) References Cited

U.S. PATENT DOCUMENTS

| | | | |
|---|---|---|---|
| 7,860,759 B2 * | 12/2010 | Stoppelman | 705/26.7 |
| 2003/0105682 A1 * | 6/2003 | Dicker et al. | 705/27 |
| 2008/0243632 A1 * | 10/2008 | Kane et al. | 705/26 |
| 2008/0243638 A1 * | 10/2008 | Chan et al. | 705/27 |
| 2008/0270250 A1 * | 10/2008 | Bolivar et al. | 705/26 |
| 2008/0313030 A1 * | 12/2008 | Makeev et al. | 705/14 |
| 2009/0099935 A1 * | 4/2009 | Hamzy et al. | 705/14 |

OTHER PUBLICATIONS

Jeffrey, S. A., & Hodge, R. (2007). Factors influencing impulse buying during an online purchase. Electronic Commerce Research, 7(3-4), 367-379. doi:http://dx.doi.org/10.1007/s10660-007-9011-8.*

* cited by examiner

*Primary Examiner* — Kathleen Palavecino
(74) *Attorney, Agent, or Firm* — Lee & Hayes, PLLC

(57) ABSTRACT

Technologies are described herein for relating individual items to categories of items purchased concurrently by a customer. A representative category may be assigned to each of the items offered for sale by an online merchant. Purchase history data containing information regarding each item purchased by a customer on a specific date is augmented with information regarding each representative category of items from which an item was purchased by the customer on the same date. From the purchase history data, an attach rate is calculated between each particular item and a number of representative categories indicating the frequency of concurrency of purchase of the particular item with items assigned to the representative category. A user interface may then be generated containing the attach rates between the particular item and the representative categories and sent to a customer computer for display to the customer.

29 Claims, 6 Drawing Sheets

RELATING INDIVIDUAL ITEMS TO SIMILAR PURCHASED CATEGORIES

BACKGROUND

An online merchant may provide a large number of items for sale to customers over the Internet. Customers may access information regarding the available items through a website or other information service provided by the merchant. The information regarding the items may include that information required by the customer to identify and purchase a particular item, such as the name of the item, a picture of the item, the price and availability of the item, and the like. In order to enhance the online shopping experience and allow the customer to fully research a particular item, the merchant may provide additional item information along with the purchase information. The additional item information may include customer ratings, product specifications, a manufacturer's description, additional pictures, alternative items, and the like The merchant may further provide a list of accessories that the customer may wish to consider purchasing in conjunction with the item. For example, to a customer looking for digital cameras, the merchant may suggest accessories such as camera bags, lenses, memory cards, and the like. Traditionally, accessory items are established for each item in the merchant's system manually by administrators of the merchant system. This may require a considerable amount of time and effort by the merchant's personnel at a high cost, especially for a merchant that offers a very large number of disparate items for sale. In addition, the accessory information for the items may not be accurate or easily established for obscure items.

The merchant may also provide a list of other items frequently purchased with the item being considered by the customer. For example, the digital camera described above may be frequently purchased with a particular, compatible lens, or a particular camera bag. This information may be misleading, however. In one example, a digital camera may be frequently purchased with a memory card, but because of the wide variety and sizes of memory cards available, no one particular memory card may rise to the level of being considered "frequently purchased" with the digital camera. It is with respect to these and other considerations that the disclosure made herein is presented.

DETAILED DESCRIPTION

Figure 1:
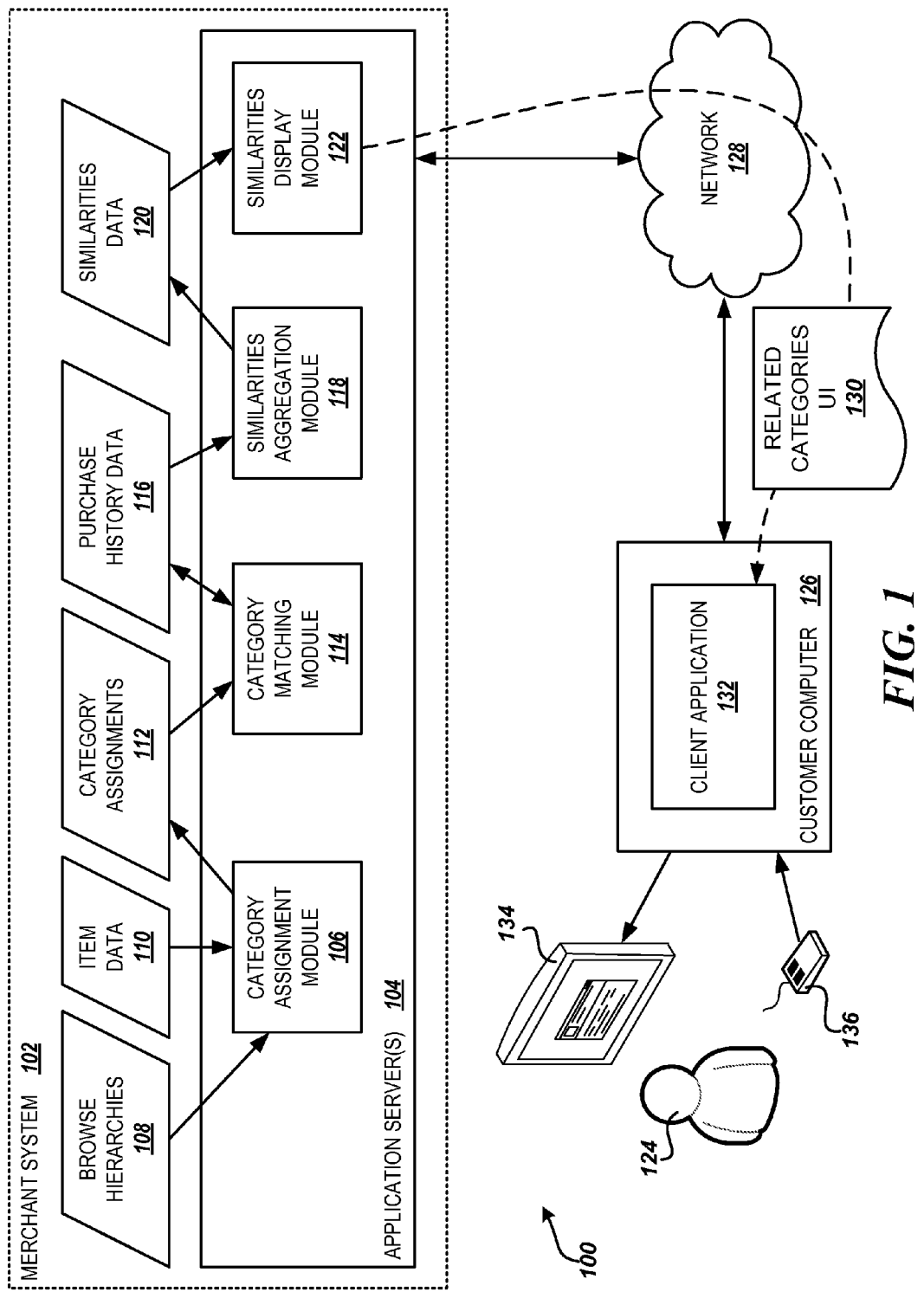
FIG. 1 is a system diagram showing aspects of an illustrative operating environment for relating individual items to categories of items purchased concurrently by customers, including several software and hardware components provided by embodiments presented herein.

The following detailed description is directed to technologies for relating individual items to categories of items purchased concurrently by a customer. Utilizing the technologies described herein, a relationship between a particular item offered for sale by an online merchant and a number of categories of items frequently purchased with the particular item may be established. The relationships between the items and the categories of items frequently purchased with the items may be established automatically, without requiring manual definition of the relationships by administrators of the merchant system. The categories of items frequently purchased with the particular item may be displayed to a customer considering purchase of the particular item through a related categories user interface ("UI") shown in conjunction with other information regarding the item. This may provide a useful tool to enhance the online shopping experience for customers without encountering the cost or inaccuracies of manually established accessory relationships, for example.

According to embodiments, a representative category is assigned to each of the items offered for sale by the merchant. Purchase history data containing information regarding each item purchased by a customer on a specific date is augmented with information regarding each representative category of items from which an item was purchased by the customer on the same date. From the purchase history data, an attach rate is calculated between each particular item and a number of representative categories indicating the frequency of concurrency of purchase of the particular item with items assigned to the representative category. A user interface may then be generated containing the attach rates between the particular item and the representative categories and sent to a customer computer for display to the customer.

It should be appreciated that the subject matter presented herein may be implemented as computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment 100 including several software components for implementing methods for relating individual items to categories of items purchased concurrently by a customer, according to embodiments provided herein. The environment 100 includes a number of application servers 104 that provide various online shopping services and other application services to a merchant system 102. The application servers 104 may execute a number of modules in order to provide the services to the merchant system 102. The modules may execute on a single application server 104 or in parallel across multiple application servers in the merchant system 102. In addition, each module may consist of a number of subcomponents executing on different application servers 104 or other computing devices in the merchant system 102. The modules may be implemented as software, hardware, or any combination of the two.

A category assignment module 106 executes on the application servers 104. The category assignment module 106 generates category assignments 112 containing an assignment of each item offered for sale by the merchant to a corresponding representative category. According to one embodiment, the category assignment module 106 utilizes data describing browse hierarchies 108 used by customers to browse through the available items, along with item data 110 regarding the individual items to perform the assignment of the items to the representative categories, as will be described in detail below in regard to FIG. 2. The data describing the browse hierarchies 108 and item data 110 may be stored in the merchant system 102 in a database or other storage system accessible by the category assignment module 106. The category assignment module 106 may be run by administrators of the merchant system 102 in order to generate or re-generate the category assignments 112 on a periodic basis, or in response to a change in the item data 110 or data describing the browse hierarchies 108. The category assignment module 106 may store the generated category assignments 112 in the database, along with the item data 110 regarding the corresponding item, for example.

The environment 100 also includes a category matching module 114 that executes on the application server 104. The category matching module 114 utilizes the category assignments 112 generated by the category assignment module 106 to add category purchase information to purchase history data 116 maintained in the merchant system 102. The purchase history data 116 may contain information regarding past purchases by customers of items and/or categories of items, as will be described in detail below in regard to FIG. 3. The category matching module 114 may be run on a periodic basis or in response to a change in the category assignments 112 or purchase history data 116, for example.

The environment 100 also includes a similarities aggregation module 118. The similarities aggregation module 118 aggregates the information regarding past purchases by customers of items and/or categories of items contained in the purchase history data 116 to generate similarities data 120. The similarities data 120 contains information regarding a frequency of concurrency of purchase between a particular item and other items or categories of items, as will be described in detail below in regard to FIG. 4. The similarities aggregation module 118 may be run to generate or re-generate the similarities data 120 on a periodic basis or in response to a change to the purchase history data 116, for example. According to embodiments, the similarities data 120 provides the information to answer the question "What do customers buy with this item," as will be described below in regard to FIG. 5.

The environment 100 may further include a similarities display module 122 that provides a display of the similarities data 120 to a customer 124 accessing the merchant system 102 through a customer computer 126 over a network 128. The network 128 may be a local-area network ("LAN"), a wide-area network ("WAN"), the Internet, or any other networking topology known in the art that connects the customer computer 126 to the merchant system 102. The customer 124 may use a client application 132 executing on the customer computer 126 to access and utilize the online shopping services provided by the application servers 104 in the merchant system 102. According to one embodiment, the client application 132 may be a web browser application, such as the MOZILLA® FIREFOX® web browser from Mozilla Foundation of Mountain View, Calif. The web browser application exchanges data with the application servers 104 in the merchant system 102 using the hypertext transfer protocol ("HTTP") over the network 128. Alternatively, the client application 132 may utilize any number of communication methods known in the art to communicate with the merchant system 102 and/or the application servers 104 across the network 128, including remote procedure calls, SOAP-based web services, remote file access, proprietary client-server architectures, and the like.

According to one embodiment, the similarities display module 122 retrieves the similarities data 120, generates a related categories user interface ("UI") 130 from the data, and transmits the related categories UI over the network 128 to the client application 132 for display to the customer 124. The related categories UI 130 may be a component of a web page consisting of hypertext markup language ("HTML"), extensible markup language ("XML"), and/or JavaScript that contains the similarities data 120 along with instructions regarding how the data is to be rendered by the client application 132 for display, for example. In one embodiment, the related categories UI 130 represents a portion of an item detail page or item purchase page containing additional information regarding the particular item, as will be described in detail below in regard to FIG. 5.

The client application 132 may receive the related categories UI 130 from the similarities display module 122 and display the included similarities data 120 to the customer on a display 134 connected to the customer computer 126. In addition, the client application 132 may allow the customer 124 to interact with the related categories UI 130, using a number of input devices connected to the customer computer 126, such as the mouse 136 shown in FIG. 1. It will be appreciated that any number of methods and technologies may be utilized that allow the similarities display module 122 to encode the similarities data 120 in the related categories UI 130 and send the UI to the customer computer 126 for display to the customer 124. It is intended that all such methods and technologies be included within the scope of this application.

Figure 2:
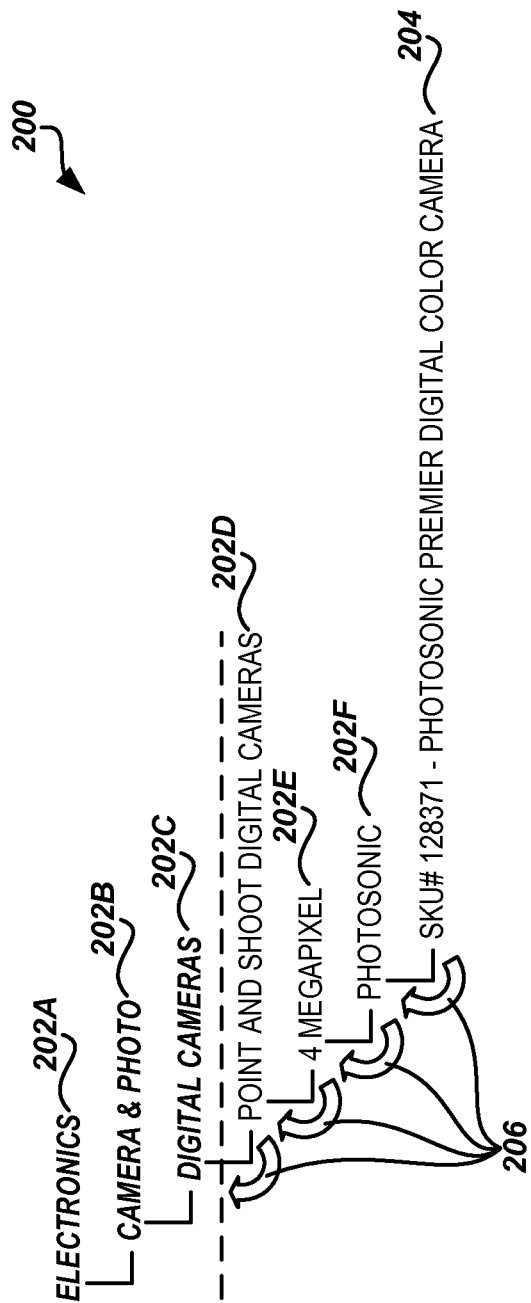
FIG. 2 is a block diagram showing aspects of an illustrative browse path through a particular browse hierarchy utilized by customers to find an item, according to embodiments presented herein.

FIG. 2 is a block diagram showing an illustrative browse path 200 for a particular item in the merchant system 102 along a particular browse hierarchy, according to embodiments. As described above, the merchant system 102 may provide browse hierarchies that allow a customer 124 to utilize a browsing UI to navigate through the items offered for sale by the merchant. The browse path 200 may represent a path from the top of a particular browse hierarchy to the particular item along which the customer 124 may navigate in order to reach the item. The browse hierarchy may consist of a number of browse nodes 202A-202F (referred to herein generally as browse node 202), each browse node representing a category of items.

The browse nodes 202 may be arranged in a hierarchical fashion, with browse nodes representing broad categories, such as browse node 202A, towards the top of the hierarchy, and browse nodes representing narrower categories, such as browse node 202F, towards the bottom of the hierarchy. At the bottom of the browse hierarchy are item nodes, such as the item node 204 shown in FIG. 2. Each item node 204 represents an item that falls under the categories represented by the browse nodes 202 above the item node in the browse hierarchy. The browse path 200 for a particular item, therefore, consists of the specific browse nodes 202A-202F in the browse hierarchy from the top browse node 202A of the hierarchy to the corresponding item node 204, as further shown in FIG. 2.

According to one embodiment, the category assignment module 106 utilizes data describing the browse hierarchies 108 to perform the assignment of each of the items offered for sale by the merchant to a representative category. The representative category may be a category in a particular browse path 200 for the item that best represents the type of item to a customer 124 who may be interested in the categories of items frequently purchased with a particular item being considered for purchase by the customer. For example, the particular digital camera corresponding to the item node 204 in FIG. 2 may be best represented by the category "Point and Shoot Digital Cameras," corresponding to browse node 202D in the browse hierarchy shown. The categories corresponding to the higher browse nodes in the hierarchy, such as the category "Digital Cameras" corresponding to browse node 202C, may be too broad, while the categories corresponding to the lower browse nodes in the hierarchy, such as the category "4 Megapixel Cameras" corresponding to browse node 202E, may be too narrow.

The category assignment module 106 may establish the assignment of the representative category to the particular item by traversing the browse nodes 202A-202F of the browse path 200 for the item from a selected browse hierarchy from the item node 204 upward until a roadblock browse node 202 is encountered, as indicated by the arrows 206 in FIG. 2. The roadblock browse nodes 202 may represent categories considered too broad to be representative categories for items. For example, in the browse hierarchy shown in the figure, the categories "Electronics," "Camera & Photo," and "Digital Cameras" corresponding to browse nodes 202A, 202B, and 202C, respectively, may be indicated as roadblock nodes. The roadblock nodes in each of the browse hierarchies 108 may be designated manually by administrators of the merchant system 102, for example.

It will be appreciated that a particular item may have corresponding item nodes 204 belonging to multiple browse hierarchies 108 within the merchant system 102. In one embodiment, administrators of the merchant system may designate a subset of the browse hierarchies 108 from which browse paths 200 are selected for the assignment of representative categories to the items. In another embodiment, the category assignment module 106 may determine representative categories from the browse paths 200 for a particular item for each of a number of browse hierarchies containing an item node 204 corresponding to the item, and then select the category having the largest number of item nodes underneath the corresponding browse node 202 as the representative category for the particular item. It will be further appreciated that other methods of assigning representative categories to the items may be implemented by the merchant, including manual designation of a representative category for each item by administrators of the merchant system 102. It is intended that all such methods of assigning representative categories to items be included in this application.

Figure 4:
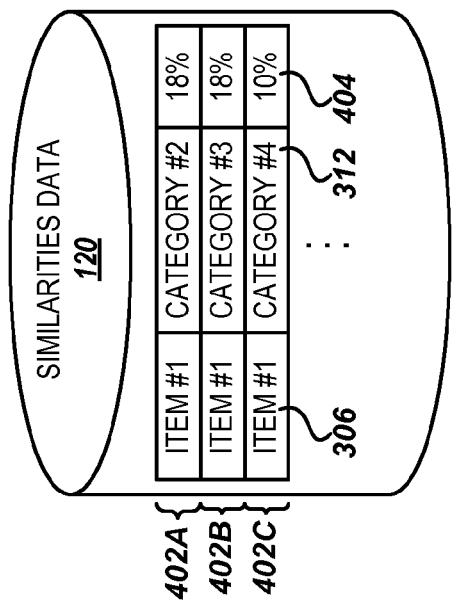
FIG. 4 is a data structure diagram illustrating a number of data elements maintained in similarities data, according to embodiments presented herein.
Figure 3:
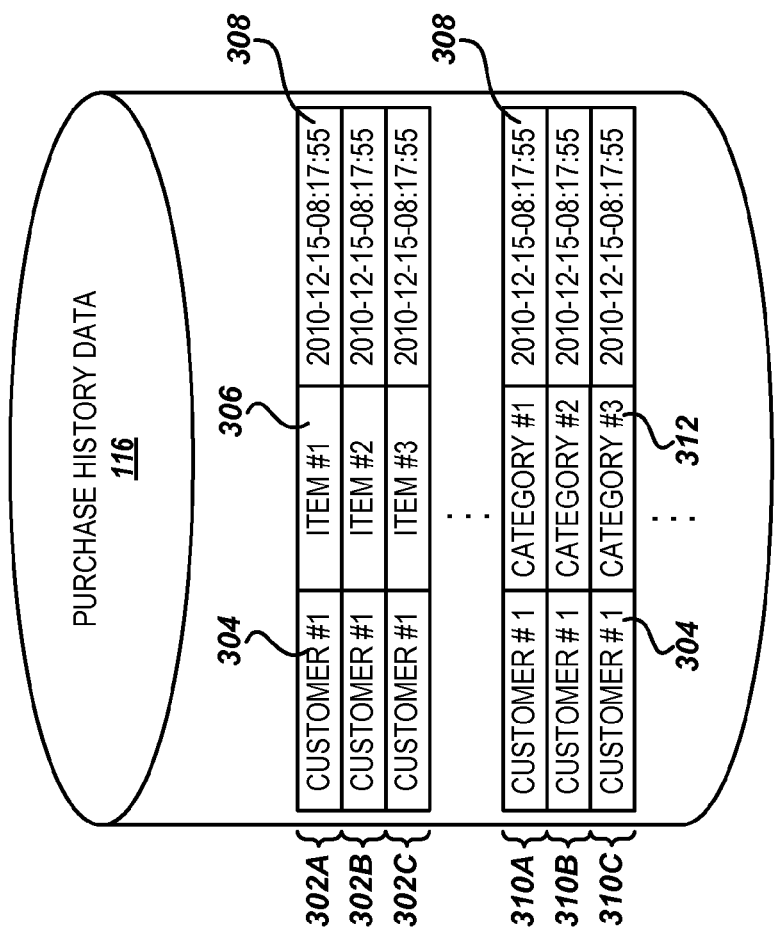
FIG. 3 is a data structure diagram illustrating a number of data elements maintained in purchase history data, according to embodiments presented herein.

FIGS. 3 and 4 are data structure diagrams showing a number of data elements stored in data structures. It will be appreciated by one skilled in the art that the data structures shown in the figure may represent rows in a database table, instances of objects stored in a computer memory, programmatic structures, or any other data container commonly known in the art. Each data element included in the data structure may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 3 shows one example of data elements that may be maintained in the purchase history data 116, according to embodiments. As described above, the purchase history data 116 may contain information regarding past purchases by customers of items and/or categories of items. For purposes of this disclosure, purchasing of an item by a customer includes, without limitation, placing an order for physical delivery of an item, acquiring a license to download files or other content, subscribing to a periodic release of information or products, acquiring access to media or other data streams, and the like.

Specifically, the purchase history data 116 may contain an item purchase entry 302A-203C (referred to herein generally as item purchase entry 302) for each item purchased by a customer 124 at a specific date and/or time within the time range of the purchase history data 116. For example, the purchase history data 116 may contain two years worth of purchase history. Each item purchase entry 302 may include a customer ID 304 identifying the customer 124 making the purchase, an item stock keeping unit ("SKU") 306 identifying the particular item purchased the customer, and a timestamp 308 identifying the date and time of purchase. It will be appreciated that for an order from a customer for three distinct items, the purchase history data 116 may contain three item purchase entries 302A-302C with the same customer ID 304, the same timestamp 308, and different item SKUs 306 identifying the three items ordered.

According to one embodiment, the category matching module 114 generates a category purchase entry 310A-310C (referred to herein generally as category purchase entry 310) corresponding to each item purchase entry 302A-302C contained in the purchase history data 116. Each category purchase entry 310 may include the customer ID 304 and timestamp 308 from the corresponding item purchase entry 302, along with a category ID 312 identifying the representative category assigned to the item identified by the item SKU 306 in the item purchase entry. The category matching module 114 may utilize the category assignments 112 generated by the category assignment module 106, as described above in regard to FIG. 2, to determine the category ID 312 for the generated category purchase entry 310 corresponding to the representative category assigned to the item from the item purchase entry 302.

FIG. 4 shows one example of data elements that may be maintained in the similarities data 120, according to embodiments. As described above, the similarities data 120 contains information regarding a frequency of concurrency of purchase between a particular item and other items or categories of items. In one embodiment, the similarities data 120 contains multiple purchase concurrency entries 402A-402C (referred to herein generally as purchase concurrency entry 402) regarding a particular item, each identifying a representative category of items and the rate of concurrency of purchase of items assigned to the representative category. Each purchase concurrency entry 402 may include an item SKU 306 identifying the particular item and a category ID 312 identifying the representative category of items.

The purchase concurrency entry 402 further includes an attach rate 404 indicating a frequency of concurrency of purchase of the particular item with items assigned to the representative category identified by the category ID 312. The similarities data 120 may be built on a periodic basis from the purchase history data 116 described above. The attach rate 404 may be calculated by calculating the frequency of occurrence in the purchase history data 116 of a category purchase entry 310 having the same customer ID 304 and a concurrent timestamp 308 as an item purchase entry 302 identifying the particular item.

In one embodiment, the timestamps 308 of the category purchase entry 310 and the item purchase entry 302 may be considered concurrent if they occur on the same day. In alternative embodiments, the timestamps 308 of the category purchase entry 310 and the item purchase entry 302 may be considered concurrent if they are the same time, i.e. part of the same order, or if they occur within some other time period of each other, such as within a week. In another embodiment, the similarities data 120 may further contain purchase concurrency entries 402 regarding a frequency of concurrence of purchase between items in particular category and other items. In other words, the attach rate 404 may be calculated by calculating the frequency of occurrence in the purchase history data 116 of purchase entries 302 for the item identified by the item SKU 306 and having the same customer ID 304 and a concurrent timestamp 308 as a category purchase entry 310 having the category ID 312 identifying the particular representative category.

The purchase concurrency entries 402 may further be filtered for significance. For example, for a particular item, the category with the highest attach rate 404 may be filtered out, since it would likely represent the representative category of the particular item itself, having an attach rate of 100%. In one embodiment, the purchase concurrency entries 402 may be filtered based on a threshold value for the number of concurrent purchases. For example, an infrequently purchased item with only two item purchase entries 302 in the purchase history data 116 may have a 50% attach rate with a category of items that is coincidental and not related. In another embodiment, the purchase concurrency entries 402 may be filtered by a threshold value for the attach rate 404, such as 5%, to ensure that the concurrency rate represents a significant relationship. It will be appreciated that additional methods or calculations may be utilized to filter the purchase concurrency entries 402 for significance, including utilizing a statistical testing algorithm, such as the Z-test. It is intended that all such methods of filtering the purchase concurrency entries 402 for significance be included in this application.

Figure 5:
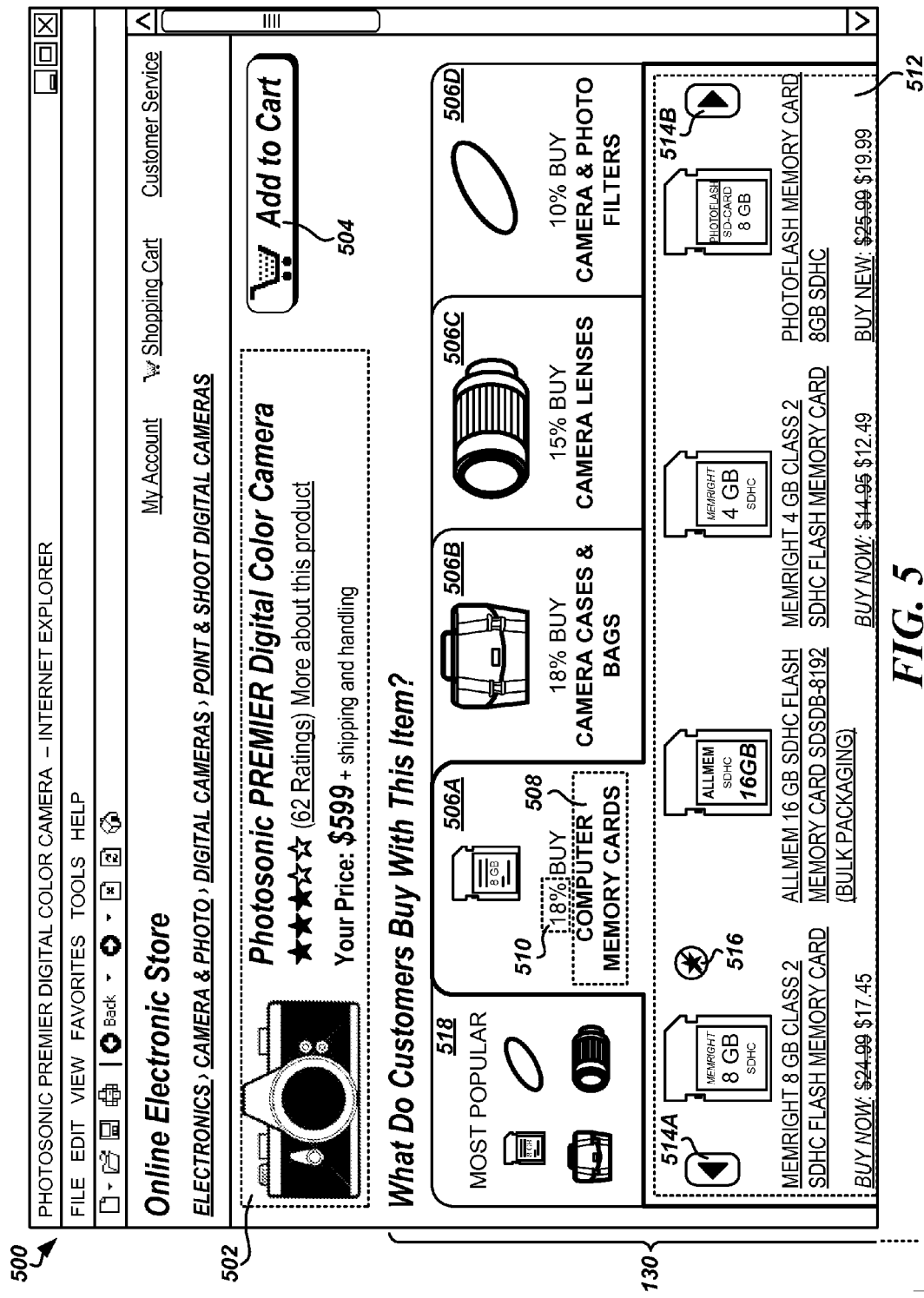
FIG. 5 is a display diagram showing an illustrative screen shot of a user interface including a related categories UI for providing a display of similarities data, according to an embodiment presented herein.

FIG. 5 shows an illustrative screen display containing the related categories UI 130 as displayed to the customer 124, according to one embodiment. The screen display includes a window 500 displayed on the display 134 by the client application 132 executing on the customer computer 126. As described above in regard to FIG. 1, the similarities display module 122 may generate the related categories UI 130 as part of an item detail or item purchase web page displayed in the window 500. The item detail or item purchase web page may include additional information 502 regarding a particular item being considered for purchase by the customer 124, along with a purchase UI control 504 allowing the customer to purchase the particular item, for example. The similarities display module 122 may retrieve the similarities data 120 described above and send it to the customer computer 126 along with instructions regarding how the related categories UI 130 is to be rendered by the client application 132. The client application 132 may then render the related categories UI 130 in the window 500 along with the other content of the item detail or item purchase web page.

In one embodiment, the related categories UI 130 may be implemented using a tab metaphor comprising a number of tab UI components 506A-506D (referred to herein generally as tab UI component 506). The individual tab UI components 506 may correspond to the representative categories of items most frequently purchased with the particular item. The similarities display module 122 may generate the tab UI components 506 by selecting a number of purchase concurrency entries 402 from the similarities data 120 having the highest attach rates 404. Each tab UI component 506 may include the category name 508 of the representative category identified by the category ID 312 from the corresponding purchase concurrency entry 402. The tab UI component 506 may also include the attach rate 404 from the corresponding purchase concurrency entry 402. In one embodiment, the tab UI component 506 further includes a representative image or icon for the items belonging to the corresponding representative category.

According to another embodiment, when the customer 124 selects one of the tab UI components 506 with an input device, such as the mouse 136 shown in FIG. 1, a list of items 512 containing specific items assigned to the corresponding representative category is shown in an area of the related categories UI 130 in proximity to the tab UI components 506A-506D. The items included in the list of items 512 may represent the items assigned to the corresponding representative category most often purchased with the particular item. This information may be maintained in the similarities data 120 along with the category-based purchase concurrency entries 402, for example. The number and order of the items selected for the list of items 512 may further depend upon compatibility data maintained in the merchant system 102 indicating those items that are compatible with the particular item; accessory data containing manually defined relationships between the particular item and accessory items; the price, customer rating, and or availability of the items in the category; and the like.

The list of items 512 may include an image or icon, a description, a price, and/or other information regarding each item in the list. Each item may further contain a UI control or hyperlink allowing additional information regarding that item to be retrieved and displayed. The list of items 512 may further include scroll UI controls 514A, 514B that allow the list of items to be scrolled by the customer 124 through the area in order to view more items included in the list.

In a further embodiment, each item may contain a stop-inclusion UI control 516. The stop-inclusion UI control 516 may allow the customer 124 to indicate to the merchant system 102 that the item should not be included in the list of items 512, because it is known to be incompatible or inappropriate for the particular item, for example. The merchant system 102 may utilize this indication and others received from customers through the stop-inclusion UI control 516 to maintain a stop list indicating items that should not be shown as related to the particular item. The stop list may be further utilized by the similarities display module 122 in determining which items to select for inclusion in the list of items 512.

According to another embodiment, the related categories UI 130 also contains a most popular tab component 518. When the customer 124 selects the most popular tab component 518, the list of items 512 may show those items most frequently purchased with the particular item, regardless of the representative category. This information may be maintained in the similarities data 120 along with the category-based purchase concurrency entries 402, for example.

Figure 6:
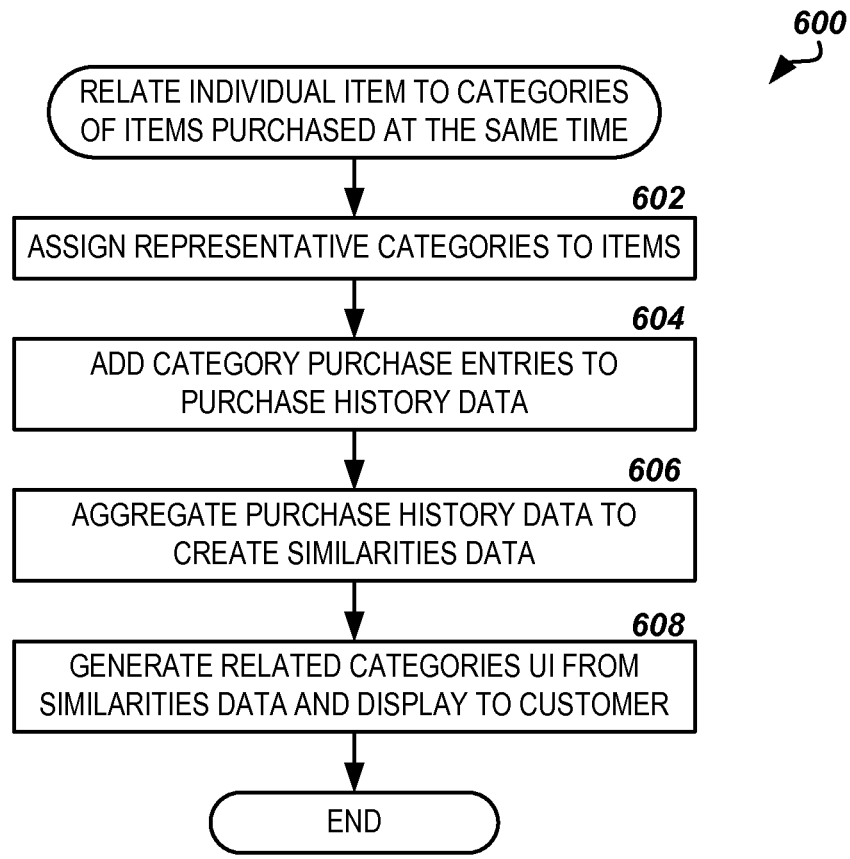
FIG. 6 is a flow diagram showing one method for relating individual items to categories of items purchased concurrently by a customer, according to embodiments described herein.

Turning now to FIG. 6, additional details will be provided regarding the embodiments presented herein for relating individual items to categories of items purchased concurrently by a customer. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 6 illustrates a routine 600 for relating individual items to categories of items purchased concurrently by a customer, according to embodiments described herein. In one embodiment, the routine 600 is performed by the category assignment module 106, the category matching module 114, the similarities aggregation module 118, and the similarities display module 122, as described above in regard to FIG. 1. It will be appreciated that the routine 600 may also be performed by other modules or components executing on the application servers 104 in the merchant system 102, or by any combination of modules and components.

The routine 600 begins at operation 602, where the category assignment module 106 assigns a representative category to each of the items offered for sale in the merchant system 102. According to one embodiment, the category assignment module 106 utilizes the methodology described above in regard to FIG. 2 to generate category assignments 112 for the items from browse paths 200 contained in the data describing the browse hierarchies 108. The category assignments 112 may be generated or re-generated on a periodic basis, or in response to a change in the item data 110 or data describing the browse hierarchies 108. The category assignment module 106 may store the generated category assignments 112 in the database, along with the item data 110 regarding the corresponding item, for example. It will be appreciated that other methodologies may be utilized to assign a representative category to each item, including, but not limited to, the manual assignment of representative categories to items by administrators of the merchant system 102.

From operation 602, the routine 600 proceeds to operation 604, where the category matching module 114 utilizes the category assignments 112 to add category purchase information to the purchase history data 116 maintained in the merchant system 102. According to one embodiment, the category matching module 114 generates a new category purchase entry 310 in the purchase history data 116 corresponding to each item purchase entry 302 contained in the data, utilizing the category assignments 112 generated by the category assignment module 106 in operation 602 to determine the category ID 312 for the category purchase entry 310, as described above in regard to FIG. 3. The category purchase entries 310 may be generated in the purchase history data 116 on a periodic basis or in response to a change in the category assignments 112 or purchase history data 116, for example.

The routine 600 proceeds from operation 604 to operation 606, where similarities aggregation module 118 aggregates the information regarding past purchases by customers of items and/or categories of items contained in the purchase history data 116 to generate the similarities data 120. As described above in regard to FIG. 4, the similarities aggregation module 118 may create a number of purchase concurrency entries 402 for a particular item identifying representative categories of items along with the attach rate 404 indicating the rate of the concurrency of purchase of items assigned to each category. The similarities aggregation module 118 may also filter the purchase concurrency entries 402 for significance, as further described above in regard to FIG. 4. The similarities data 120 may be generated or re-generated by the similarities aggregation module 118 on a periodic basis or in response to a change to the purchase history data 116, for example.

From operation 606, the routine 600 proceeds to operation 608, where the similarities display module 122 retrieves a number of the purchase concurrency entries 402 from the similarities data 120 corresponding to a particular item having the highest attach rates 404 and generates the related categories UI 130 for display to the customer 124 on the customer computer 126, as described above in regard to FIG. 5. It will be appreciated that the similarities display module 122 may utilize the similarities data 120 to generate other user interfaces using other methodologies beyond the related categories UI 130 described herein. It is intended that this application include all such UIs and methodologies for displaying category-based similarities data 120 to the customer 124. From operation 608, the routine 600 ends.

Figure 7:
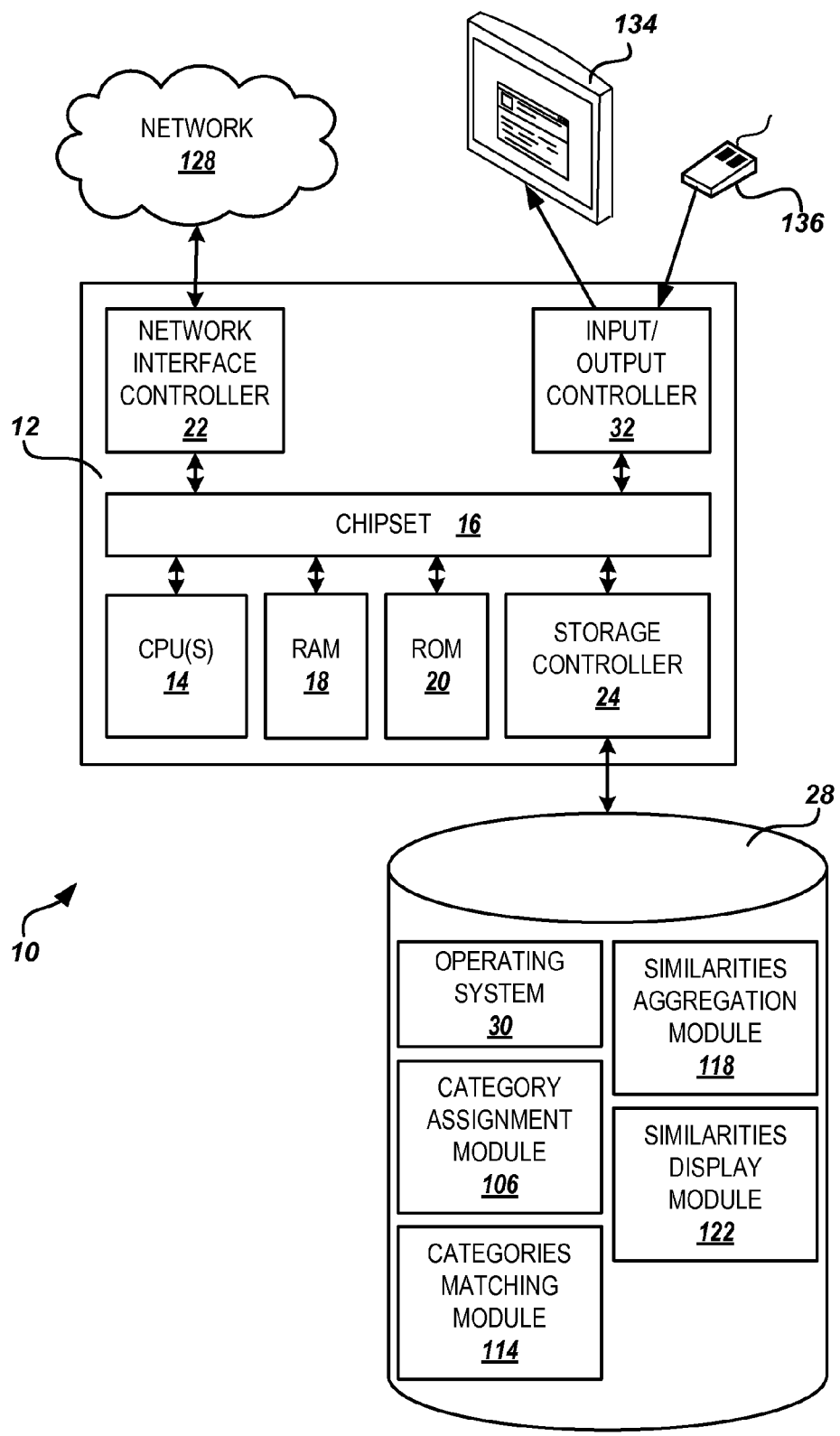
FIG. 7 is a computer architecture diagram showing an illustrative computer hardware architecture for computing devices described in embodiments presented herein.

FIG. 7 shows an example computer architecture 10 for a computer 12 capable of executing the software components described herein for relating individual items to categories of items purchased concurrently by a customer, in the manner presented above. The computer architecture 10 shown in FIG. 7 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 104, customer computer 126, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through the network 128, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. The NIC 22 is capable of connecting the computer 12 to other computing devices over the network 128, such as other application servers 104, the customer computer 126, a data storage system in the merchant system 102, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage medium to store and retrieve information, such as program modules, data structures, or other data. It should be appreciated by those skilled in the art that computer-readable storage media can be any available non-transitory media that may be accessed by the computer 12. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the category assignment module 106, the category matching module 114, the similarities aggregation module 118, and the similarities display module 122, each of which was described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 600 for relating individual items to categories of items purchased concurrently by a customer, as described above in regard to FIG. 6.

The computer 12 may also include an input/output controller 32 for receiving and processing input from a number of input devices, such as a keyboard, the mouse 136, a touchpad, a touch screen, an electronic stylus, or other type of input device. Similarly, the input/output controller 32 may provide output to a display 134, such as a computer monitor, a flat-panel display, a digital projector, a printer, a plotter, or other type of output device. It will be appreciated that the computer 12 may not include all of the components shown in FIG. 7, may include other components that are not explicitly shown in FIG. 7, or may utilize an architecture completely different than that shown in FIG. 7.

Based on the foregoing, it should be appreciated that technologies for relating individual items to categories of items purchased concurrently by a customer are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to at least:

update purchase history data in response to a purchase of an item in a merchant system, the purchase history data including an item purchase entry associated with the purchase of the item;

assign the item to a representative category to in the merchant system based, at least in part, on the purchase history data;

add a category purchase entry to the purchase history data in response to the purchase of the item, wherein the category purchase entry specifies the representative category assigned to the item;

aggregate category purchase entries in the purchase history data to create aggregated similarities data, the aggregated similarities data including an attach rate that indicates how often a particular item is purchased concurrently with one or more other items, wherein the particular item is assigned to a first category;

receive a request from a second computer to view information about the particular item; and in response to the request, identify, using the aggregated similarities data, a second category that includes first items purchased concurrently with the particular item, identify, using the aggregated similarities data, a third category that includes second items purchased concurrently with the particular item, identify, a first list of items from the first items assigned to the second category based, at least in part, on the attach rate, identify, a second list of items from the second items assigned to the third category based, at least in part, on the attach rate, generate a first selectable user interface (UI) component, to represent the second category, that when selected displays the first list of items assigned to the second category that are identified from the aggregated similarities data as commonly purchased with the particular item, generate a second selectable user interface component, to represent the third category, that when selected displays the second list of items assigned to the third category that are identified from the aggregated similarities data as commonly purchased with the particular item, generate a related categories user interface containing data about the particular item requested by the second computer, the first selectable UI component associated with the first list of items not requested by the second computer, and the second selectable UI component associated with the second list of items not requested by the second computer, and cause a client application on the second computer to display, on a display associated with the second computer, the data about the particular item within a first portion of related categories user interface, display, on the display associated with the second computer, the first selectable UI component within a second portion of the related categories user interface and the second selectable UI component within the second portion of the related categories user interface, receive a selection of the first selectable UI component;

display, on the display associated with the second computer, first data about the first list of items within a third portion of the related categories user interface, receive a selection of the second selectable UI component while displaying the first data about the first list of items within the third portion of the related categories user interface; and display, on the display associated with the second computer, second data about the second list of items within the third portion of the related categories user interface, and enable the second computer to navigate to the third portion of the related categories user interface initiate a purchase, from a merchant system, an item selected from one or more of the first list of items or the second list of items.

2. The non-transitory computer-readable storage medium of claim 1, wherein assigning the item to the representative category is further based, at least in part, on a browse path associated with the item, the browse path traversing a plurality of hierarchically organized browse nodes representing categories of decreasing scope of inclusion until a browse node designated as a roadblock node is reached.

3. The non-transitory computer-readable storage medium of claim 1, wherein the category purchase entry comprises a customer ID, a category ID, and a timestamp indicating a date and time of purchase.

4. The non-transitory computer-readable storage medium of claim 1, wherein the aggregated similarities data are filtered for significance.

5. The non-transitory computer-readable storage medium of claim 1, wherein entries in the aggregated similarities data having an attach rate less than a threshold value are filtered out of the aggregated similarities data.

6. The non-transitory computer-readable storage medium of claim 1, wherein entries in the aggregated similarities data having a number of concurrent purchases less than a threshold value are filtered out of the similarities data.

7. The non-transitory computer-readable storage medium of claim 1, wherein the first selectable user interface component comprises a tab user interface component.

8. The non-transitory computer-readable storage medium of claim 1, wherein the computer-executable instructions stored thereon that, when executed by a computer, further cause the computer to receive a selection of the first selectable user interface component and display the first data about the first list of items.

9. The non-transitory computer-readable storage medium of claim 8, wherein the first list of items is determined based at least in part on a frequency of concurrency of purchase between an individual item in the first list of items and the particular item.

10. The non-transitory computer-readable storage medium of claim 8, wherein the first list of items is determined based at least in part on compatibility data regarding individual ones of the first list of items and the particular item.

11. The non-transitory computer-readable storage medium of claim 8, wherein an ordering of the items comprising the first list of items is based at least in part on at least one of a frequency of concurrent purchase between individual ones of the first list of items and the particular item, a customer rating regarding individual ones of the first list of items, a price associated with individual ones of the first list of items, or an availability associated with individual ones of the first list of items.

12. The computer-readable storage medium of claim 1, wherein concurrently refers to purchases on a same day.

13. A computer-implemented method comprising:
calculating attach rates for a particular item with representative categories, wherein the attach rates indicate a rate of occurrence of a concurrent purchase of the particular item by a same customer and one or more items assigned to the representative categories;
identifying a portion of the representative categories to include within a user interface based at least in part on the attach rates;
generating selectable user interface components for the portion of the representative categories, wherein individual ones of the selectable user interface components when selected display a list of items assigned to the corresponding representative category that are identified as commonly purchased with the particular item;
generating the user interface comprising data about the particular item, the at least the selectable user interface components, the user interface including data for at least a portion of the attach rates selected based, at least in part, on the particular item;
receiving a request from a second computer to view information about the particular item; and
in response to receiving the request,
causing a client application on the second computer to perform operations including
displaying, on a display associated with the second computer, the data about the particular item within a first portion of the user interface,
displaying, on the display associated with the second computer, the selectable user interface components within a second portion of the user interface;
displaying, on the display associated with the second computer, the list of items assigned to a first representative category within a third portion of the user interface, and
displaying, on the display associated with the second computer, the list of items assigned to a second representative category within the third portion of the user interface based, at least in part, on a selection of one of the selectable user interface components within the second portion of the user interface.

14. The computer-implemented method of claim 13, further comprising assigning a representative category to individual items in a merchant system, wherein the representative category assigned to the individual items is selected based at least in part on a browse path associated with the individual item, the browse path traversing a plurality of hierarchically organized browse nodes representing categories of decreasing scope of inclusion.

15. The computer-implemented method of claim 14, wherein a particular browse node for the representative category is selected based, at least in part, on a traversal of the plurality of hierarchically organized browse nodes along the browse path from an item node associated with the item until a browse node designated as a roadblock is encountered.

16. The computer-implemented method of claim 13, wherein the attach rates are calculated from purchase history data comprising:
item purchase entries, individual item purchase entries indicating a specific date the individual item was purchased by a customer; and
category purchase entries, individual category purchase entries indicating the customer purchased the individual item assigned to at least one of the representative categories on the specific date.

17. The computer-implemented method of claim 16, further comprising:
applying a significance filter to the attach rates based at least in part on a number of concurrent purchases between the particular item and items assigned to the representative categories in the purchase history data.

18. The computer-implemented method of claim 13, wherein generating the selectable user interface components comprises generating tab user interface components.

19. The computer-implemented method of claim 13, further comprising receiving a selection of one of the selectable user interface components and provide for display the list of items.

20. A system comprising:
one or more application servers in a merchant system; and
one or more modules executing on the application servers and configured to at least:

calculate an attach rate for individual ones of one or more representative categories of items, wherein the attach rate indicates a rate of occurrence of purchase of, by a same customer at a concurrent time, a particular item and one or more items assigned to the representative category;

receive a request from a computer to view information about the particular item;

identify representative categories to include within a related categories user interface based at least in part on attach rates;

generate selectable user interface components based at least in part on the representative categories identified, wherein when an individual one of the selectable user interface components is selected a list of items assigned to the representative category that are identified as commonly purchased with the particular item is displayed;

generate the related categories user interface comprising data about the particular item, the selectable user interface components, and the corresponding attach rates to be sent to the computer for display; and cause a client application on the computer to
display, on a display associated with the computer, the data about the particular item within a first portion of the user interface, display, on the display associated with the computer, the selectable user interface components within a second portion of the user interface;

display, on the display associated with the computer, the list of items assigned to a first representative category within the third portion of the user interface based, at least in part, on a selection of one of the selectable user interface components within the second portion of the user interface, and display, on the display associated with the computer, the list of items assigned to a second representative category within the third portion of the user interface based, at least in part, on a selection of a different one of the selectable user interface components within the second portion of the user interface.

21. The system of claim 20, wherein the attach rate for the individual ones of the one or more representative categories is calculated from purchase history data comprising item purchase entries, the item purchase entries indicating a purchase date by a customer and category purchase entries, the category purchase entries indicating the customer purchased an item assigned to the one or more representative categories on the purchase date.

22. The system of claim 20, wherein the selectable user interface components are tab user interface components.

23. The system of claim 22, wherein the list of items is displayed beneath the selectable user interface components when an individual one of the selectable user interface components is selected.

24. The system of claim 20, wherein the user interface displays a percentage of customers that purchase another item with the particular item.

25. A computer-implemented method for relating a particular item to categories of items purchased concurrently by customers, the method comprising:

for individual ones of one or more representative categories, calculating an attach rate that indicates a rate of purchase of the particular item and purchase of items assigned to the representative category at a concurrent time by a same customer;

identifying representative categories to include within a user interface based at least in part on attach rates;

generating selectable user interface components based at least in part on the representative categories identified, wherein when an individual one of the selectable user interface components is selected a list of items assigned to the representative category that are identified as commonly purchased with the particular item is displayed;

generating the user interface comprising the selectable user interface components and the attach rate calculated for each of the one or more representative categories; and receiving a request from a second computer to view information about the particular item; and in response to receiving the request,
causing a client application on the second computer to perform operations including
displaying, on a display associated with the second computer, the information about the particular item within a first portion of the user interface, displaying, on the display associated with the second computer, the selectable user interface components within a second portion of the user interface; and displaying, on the display associated with the second computer, the list of items within a third portion of the user interface, and enabling the second computer to initiate a purchase, from the merchant system, an item selected from the list of items.

26. The computer-implemented method of claim 25, further comprising:

maintaining purchase history data comprising item purchase entries, the item purchase entries indicating a purchase date of an item by the customer and category purchase entries, the category purchase entries indicating the customer purchased an item assigned to a representative category on the purchase date; and calculating the attach rate for each of the one or more representative categories based on the purchase history data.

27. The computer-implemented method of claim 25, further comprising:

applying a significance filter to the attach rates calculated for the one or more representative categories based, at least in part, in part on a number of concurrent purchases between the particular item and items assigned to the representative category.

28. The computer-implemented method of claim 25, wherein the selectable user interface components are tab user interface components.

29. The computer-implemented method of claim 25, wherein the list of items is displayed beneath the selectable user interface components.

* * * * *